(12) United States Patent
Kuniba

(10) Patent No.: US 8,619,165 B2
(45) Date of Patent: Dec. 31, 2013

(54) IMAGE PROCESSING DEVICE FOR CORRECTING SIGNAL IRREGULARITY, CALIBRATION METHOD, IMAGING DEVICE, IMAGE PROCESSING PROGRAM, AND IMAGE PROCESSING METHOD

(75) Inventor: Hideyasu Kuniba, Tokyo (JP)

(73) Assignee: Nikon Corporation, Tokyo (JP)

( * ) Notice: Subject to any disclaimer, the term of this patent is extended or adjusted under 35 U.S.C. 154(b) by 461 days.

(21) Appl. No.: 12/312,610

(22) PCT Filed: Dec. 20, 2007

(86) PCT No.: PCT/JP2007/001443
§ 371 (c)(1),
(2), (4) Date: May 19, 2009

(87) PCT Pub. No.: WO2008/081574
PCT Pub. Date: Jul. 10, 2008

(65) Prior Publication Data
US 2010/0053382 A1    Mar. 4, 2010

(30) Foreign Application Priority Data
Dec. 26, 2006    (JP) .................................. 2006-350070

(51) Int. Cl.
*H04N 9/64* (2006.01)

(52) U.S. Cl.
USPC .......................................... 348/251; 358/461

(58) Field of Classification Search
USPC ......................................................... 348/251
See application file for complete search history.

(56) References Cited

U.S. PATENT DOCUMENTS

| 7,408,576 | B2 * | 8/2008 | Pinto et al. | 348/251 |
| 2004/0008389 | A1 | 1/2004 | Nishimura | |
| 2004/0090538 | A1 * | 5/2004 | Kadohara | 348/230.1 |
| 2005/0275904 | A1 * | 12/2005 | Kido et al. | 358/461 |

FOREIGN PATENT DOCUMENTS

| JP | A-2003-169255 | 6/2003 | | |
| JP | A-2004-048320 | 2/2004 | | |
| JP | 2004-112423 A1 * | 4/2004 | | H04N 5/335 |
| JP | A-2004-112423 | 4/2004 | | |
| JP | A-2005-175145 | 6/2005 | | |

* cited by examiner

*Primary Examiner* — Anthony J Daniels
(74) *Attorney, Agent, or Firm* — Oliff & Berridge, PLC

(57) ABSTRACT

An image processing device of the present application includes an image acquisition unit, a slope generation unit, and a slope correction unit. The image acquisition unit takes in an image data generated by an imaging element. The slope generation unit generates a slope correction data correcting, in a slope-shape, a signal irregularity caused in the image data due to a manufacturing process of the imaging element. The slope correction unit corrects the signal irregularity within the image data using the slope correction data.

10 Claims, 9 Drawing Sheets

IMAGE PROCESSING DEVICE FOR CORRECTING SIGNAL IRREGULARITY, CALIBRATION METHOD, IMAGING DEVICE, IMAGE PROCESSING PROGRAM, AND IMAGE PROCESSING METHOD

CROSS REFERENCE TO RELATED APPLICATION

This application is a U.S. National Stage application claiming the benefit of prior filed International Application Number PCT/JP2007/001443, filed Dec. 20, 2007, in which the International Application claims a priority date of Dec. 26, 2006 based on prior filed Japanese Application Number 2006-350070, the entire contents of which are incorporated herein by reference.

TECHNICAL FIELD

The present application relates to an image processing device, a calibration method, an imaging device, an image processing program, and an image processing method.

BACKGROUND ART

In a digital single lens reflex camera, an imaging element with a large element size is installed. As for this kind of imaging element, the size which a photolithography process can handle at one time is limited due to a relation of production equipment (a stepper etc.) of a semi-conductor. Therefore, a manufacturing process of the imaging element performs a segment exposure with the process divided in multiple times while shifting an exposure region as required. The imaging element having this multicycle segment exposure performed thereon has a possibility that the property may vary in each region of the segment exposure. Due to this property variation, signal irregularity is caused in an image data which the imaging element generates.

Patent Document 1 is known as a technology which corrects the signal irregularity of this kind. This conventional technology, by multiplying a pixel direction orthogonal to a boundary line of the segment exposure by an identical correction value uniformly, corrects a signal level difference caused in the boundary line (for example, FIG. 3 of Patent Document 1). Patent Document 1: Japanese Unexamined Patent Application Publication No. 2004-112423.

DISCLOSURE

Problems to be Solved

The signal level difference caused in the boundary of the segment exposure and a slope variation caused in an edge part of an imaging region, or the like, are intricately superimposed on the image data.

The conventional technology mentioned above multiplies the specific pixel direction by the correction value uniformly. Therefore, the conventional technology can not remove the signal irregularity which varies in specific pixel directions, and the practical removal thereof is impossible.

Then, a proposition of the present application is to remove practically the intricate signal irregularity due to the imaging element.

Means for Solving the Problems

<1> The image processing device of the present embodiment includes an image acquisition unit, a slope generation unit, and a slope correction unit.

The image acquisition unit takes in an image data generated by an imaging element.

The slope generation unit generates a slope correction data correcting, in a slope shape waveform, a signal irregularity-caused in the image data due to a manufacturing process of the imaging element.

The slope correction unit corrects the signal irregularity within the image data using the slope correction data.

<2> Preferably, the slope generation unit generates the slope correction data by dividing an image region where the signal irregularity is caused into a plurality of blocks, storing correction information of a representative-point position in each of the blocks, and interpolating and computing the correction information of the representative-point position.

<3> In the image data, a signal level difference may be caused in the image data due to a boundary of a segment exposure at the time of manufacturing the imaging element. In this case, as for the slope generation unit, it is preferred to generate the data as a slope correction data the signal level difference into a slope shape. The slope correction unit can correct the signal level difference to a smooth slope variation using the slope correction data.

<4> In the image data, a slope variation may be caused in an edge part of the image data due to the manufacturing process of the imaging element. In this case, as for the slope generation unit, it is preferred to generate the data as a slope correction data canceling, the slope variation. The slope correction unit can correct the slope variation of the edge part using the slope correction data.

<5> In image data, a color shading may be caused in each region of the segment exposure due to the segment exposure at the time of manufacturing the imaging element.

Then, the image processing device according to any one of items <1> to <4>, preferably further includes a per-region storage unit and a per-region removal unit.

The per-region storage unit stores a color shading caused in each region of the segment exposure.

The per-region removal unit removes the color shading in each region from the image data.

<6> Another image processing device of the present embodiment includes an image acquisition unit, a per-region storage unit, and a per-region removal unit.

The image acquisition unit takes in an image data generated by an imaging element.

The per-region storage unit stores a color shading caused in each region of a segment exposure due to the segment exposure at the time of manufacturing an imaging element.

The per-region removal unit removes the color shading in each region from the image data.

<7> A calibration method of the present embodiment is a method of calibrating the image processing device according to any one of items <1> to <5>, and the method includes the steps of:

(1) generating a test image data by performing photoelectric conversion on a uniform light with the imaging element manufactured by a multicycle segment exposure;

(2) detecting a color shading in each region by dividing the test image data into each region of the segment exposure, and fitting each region of the image to a signal pattern of the color shading;

(3) removing the color shading in each region from the test image data;

(4) detecting a signal irregularity remaining in the test image data having removed the color shading in each region; and (5) calculating correction information indicating the signal irregularity, and setting to the slope generation unit.

<8> An imaging device of the present embodiment is characterized by including the image processing device according to any one of items <1> to <6>, and an image pickup section generating an image data by performing photoelectric conversion on a subject with an imaging element, in which the image processing device performs process on the image data generated by the image pickup section.

<9> An image processing program of the present embodiment is the program causing a computer to function as the image processing device according to any one of items <1> to <6>.

<10> An image processing method of the present embodiment includes the steps of:

(1) taking in an image data generated by an imaging element;

(2) generating a slope correction data correcting, in a slope-shape waveform, a signal irregularity caused in the image data due to a manufacturing process of the imaging element; and (3) correcting the signal irregularity within the image data using the slope correction data.

EFFECTS

In the present application, the correction data (the slope correction data) which change and converge to the slope shape are used. Since a covering range of each of the slope correction data is limited, the signal irregularity caused intricately two-dimensionally can be corrected flexibly by disposing the slope correction data locally.

BRIEF DESCRIPTION OF THE DRAWINGS

FIG. 2 illustrates an imaging region of an imaging element 12a.

DETAILED DESCRIPTION OF THE EMBODIMENTS

<Configuration of Embodiment>

Figure 1:
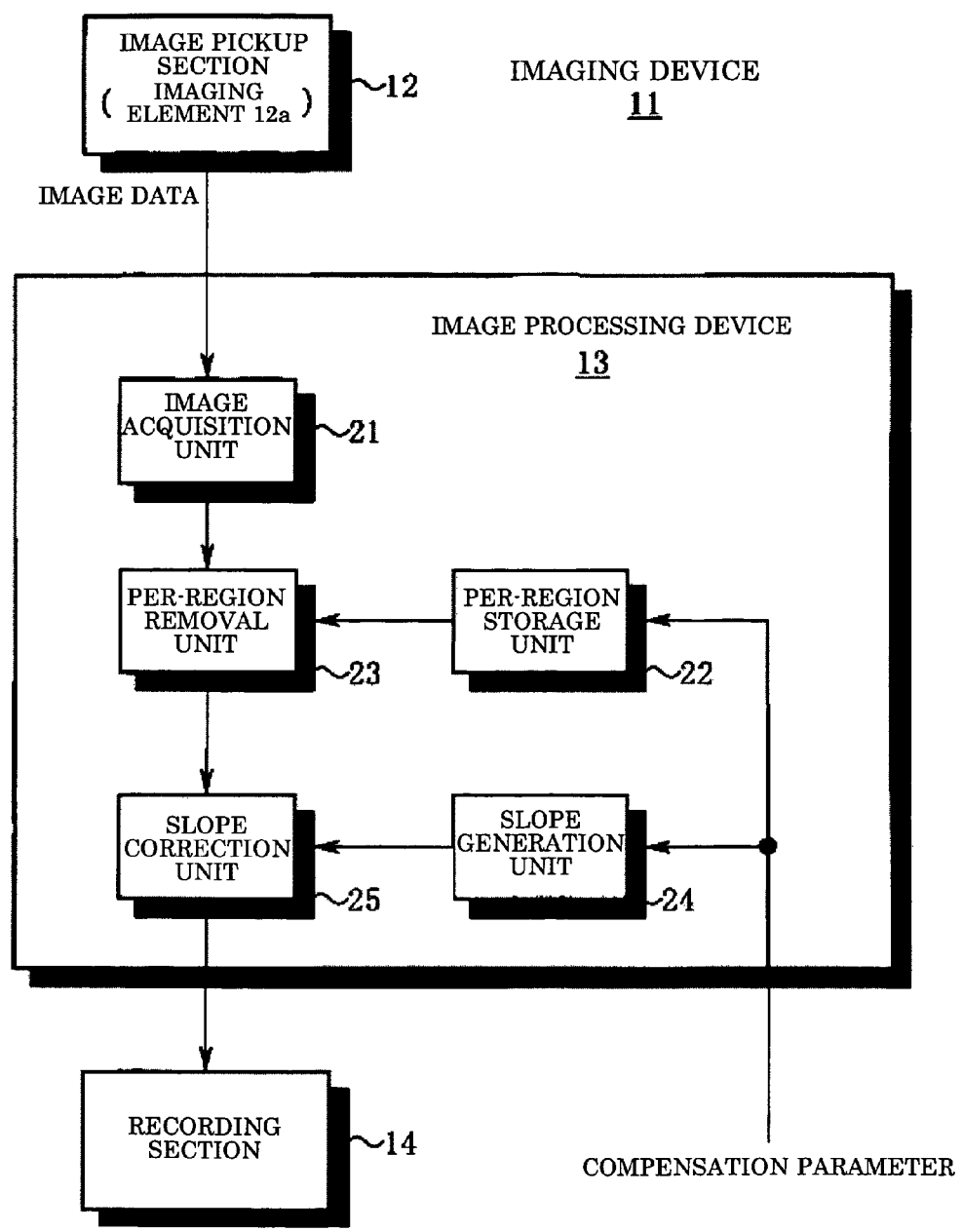
FIG. 1 is a block diagram illustrating an imaging device 11 of the present embodiment.

FIG. 1 is a block diagram illustrating an imaging device 11 of the present embodiment.

In FIG. 1, the imaging device 11 roughly includes an image pickup section 12, an image processing device 13, and a recording section 14.

Figure 2:
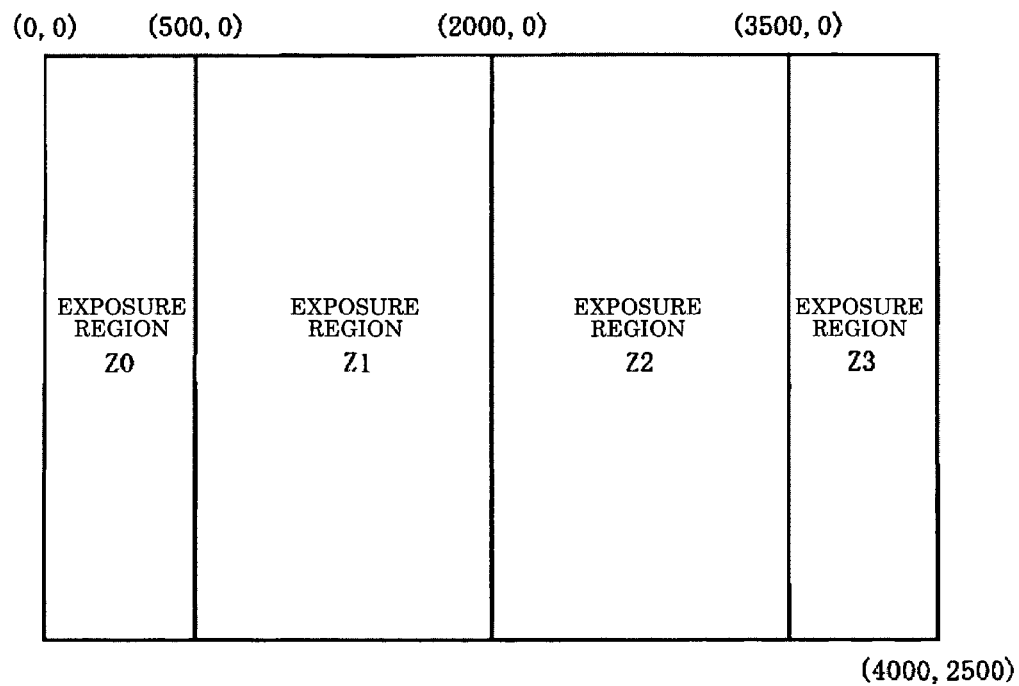

In this image pickup section 12, an imaging element 12a is installed. An element size of this imaging element 12a exceeds an exposure size of a practicable photolithography process at one time. Therefore, a manufacturing process of the imaging element 12a performs a segment exposure by dividing an exposure of an imaging region into 4 times of exposures while shifting the exposure regions Z0 to Z3 as illustrated in FIG. 2. The segment exposure here is one for manufacturing at least one of a semiconductor layer, a color filter layer, and a microlens layer.

Furthermore, the image processing device 13 includes the following components:

(1) an image acquisition unit 21 that takes in image data which the image pickup section 12 outputs;

(2) a per-region storage unit 22 that stores a color shading of the imaging element 12a in each of the exposure regions Z0 to Z3;

(3) a per-region removal unit 23 that removes the color shading from the image data;

(4) a slope generation unit 24 that generates slope correction data correcting signal irregularity (a signal level difference, a slope variation, or the like) of the image data; and (5) a slope correction unit 25 that corrects the signal irregularity within the image data using the slope correction data.

<Calibration Method of Image Processing Device 13>

In the imaging element 12a, the signal irregularity is caused in the image data due to the manufacturing process. The signal irregularity has an individual difference since the signal irregularity vary for each individual imaging-element 12a. In order to cope with such individual difference, it is preferred to calibrate the image processing device 13 individually for each of the imaging device 11.

Figure 3:
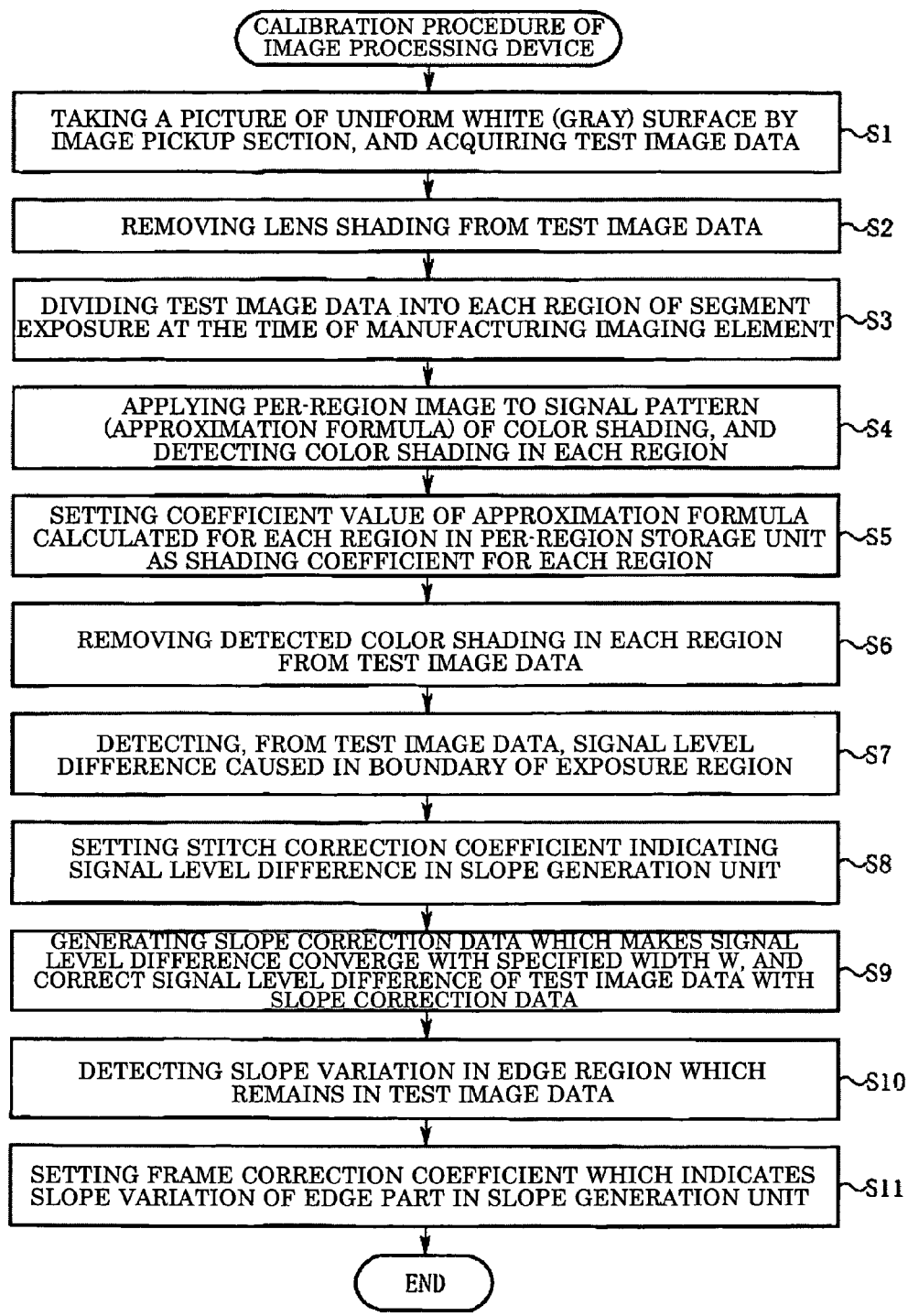
FIG. 3 is a flow chart illustrating a calibration procedure of an image processing device 13.

FIG. 3 is a flow chart illustrating a calibration procedure of this image processing device 13. Calibration persons (an adjustment person at the time of factory shipment, a user, or the like) perform this calibration procedure. A controlling section may be installed in the imaging device 11 to perform the following calibration procedure.

Hereinafter, FIG. 3 will illustrate this calibration process along with a step number.

Step S1: The process in step S1 takes a picture of a test chart determined in advance using the image pickup section 12 to acquire a test image data. Since detecting the signal irregularity becomes difficult if the test image data includes intricate image information, it is preferred to take a picture of a white (gray) surface of a uniform gray scale when generating the test image data.

The image pickup section 12 performs, for this test image data, the following processes:

(1) a correction of a gain difference and a line crawl caused between read-out channels of the imaging element 12a;

(2) a black level correction of an image using an optical black output (a pixel output of a dark state) of the imaging element 12a;

(3) a defective pixel correction; and (4) a white balance correction (including a sensitivity difference correction of a RGB pixel).

Step S2: A lens shading is caused in the image data due to an optical property or the like of a shooting lens. It is preferred to remove the lens shading from the test image data in order to remove the optical property of the shooting lens.

When the lens shading of the shooting lens is already measured actually in advance, the measured data of this lens shading may be removed from the test image data.

On the other hand, when the lens shading of the shooting lens is not yet measured, the lens shading can be removed from the test image data with the following procedures of:

(1) computing a luminance component from the test image data to generate a luminance image;

(2) contracting the luminance image, for example to 30 pixels×20 pixels, to generate a contraction image;

(3) calculating the brightness maximum Ymax of the contraction image; and (4) performing fitting of the contraction image into an approximation formula of the lens shading. As for an ordinary lens shading, it is possible to perform the fitting using a formula of an approximate curved surface f(x, y) showing a point symmetry with respect to an optical axis center of the shooting lens.

When the shooting lens is a particular kind of lens, such as a flexion optical system and a tilt optical system, it is possible to perform the fitting of the lens shading using more general formula [1].

[Formula 1]

$$f(x,y)=k_1x^3+k_2x^2y+k_3x^2+k_4xy^2+k_5xy+k_6x+k_7y^3+k_8y^2+k_9y+k_{10} \quad [1]$$

where, (x, y) are a coordinate position in a pixel space.

(5) substituting the pixel value $Z_0$ of the test image data into the following formula to calculate a pixel value $Z_1$ having the lens shading removed.

[Formula 2]

$$Z_1(x, y) = Z_0(x, y) \times \frac{V\text{max}}{f\left(\frac{30x}{W}, \frac{20y}{H}\right)} \quad [2]$$

where, W is a horizontal number of pixels of the test image data, and H is a vertical number of pixels of the test image data.

Step S3: The process in step S3 performs a color interpolation processing, as required, to the test image data having the lens shading removed, to convert into a RGB image having a RGB component per pixel.

The process in step S3 lays out this RGB image according to the exposure regions Z0 to Z3 illustrated in FIG. 2, and divides them into a per-region image Mi (i=0 to 3) of the following pixel-number-size.

The per-region image M0: horizontal 500 pixels×vertical 2500 pixels.

The per-region image M1: horizontal 1500 pixels×vertical 2500 pixels.

The per-region image M2: horizontal 1500 pixels×vertical 2500 pixels.

The per-region image M3: horizontal 500 pixels×vertical 2500 pixels.

Step S4: The process in step S4, subsequently, performs resolution conversion of the per-region image Mi (i=0 to 3) into the following pixel-number-size for the purpose of removing a high-frequency noise and reducing the fitting computation amount.

The contraction image of the per-region image M0: horizontal 55 pixels×vertical 57 pixels.

The contraction image of the per-region image M1: horizontal 63 pixels×vertical 57 pixels.

The contraction image of the per-region image M2: horizontal 63 pixels×vertical 57 pixels.

The contraction image of the per-region image M3: horizontal 55 pixels×vertical 57 pixels.

The process in step S4 calculates each of the maximum values Vmax of the RGB value from the contraction image of this per-region image Mi. The process in step S4, based on this maximum value Vmax, normalizes the inverse number of the pixel values (Ri, Gi, Bi) of the contraction image of the per-region image Mi to one or more numeric values and calculates a shading correction map Si (i=0 to 3) for each region.

$$Si(x,y)=[V\text{max}/Ri(x,y),V\text{max}/Gi(x,y),V\text{max}/Bi(x,y)]$$

Subsequently, the process in step S4 performs fitting of the shading correction map Si (i=0 to 3) for each region to the approximate curved surface shown by above-mentioned formula [1] for each of the RGB components, and calculates coefficients $k_1$ to $k_{10}$.

The coefficients $k_1$ to $k_{10}$ indicate the approximate curved surface of the pixel-number-size of the contraction image. Then, the process in step S4 converts the value of coefficients $k_1$ to $k_{10}$ so as to expand this approximate curved surface to the pixel-number-size of the per-region image Mi.

Step S5: The process in step S5 sets the coefficients $k_1$ to $k_{10}$, after the conversion, in an internal register of the per-region storage unit 22. As for the large coefficient value exceeding the numerical value range settable in the internal register, the process in step S5 performs the fitting again by limiting or omitting the coefficient terms of the formula [1]. By such process, the process in step S5 can set all the coefficients $k_1$ to $k_{10}$ in the internal register of the per-region storage unit 22.

Step S6: The process in step S6 calculates the approximate curved surface of the shading correction map Si (i=0 to 3) for each region using the coefficients $k_1$ to $k_{10}$ set in the per-region storage unit 22 in step S5.

The process in step S6 multiplies the test image data having the lens shading removed by a correction factor of the RGB component which the approximate curved surface for each region indicates. This process can remove the color shading in each region from the test image data.

Figure 4:
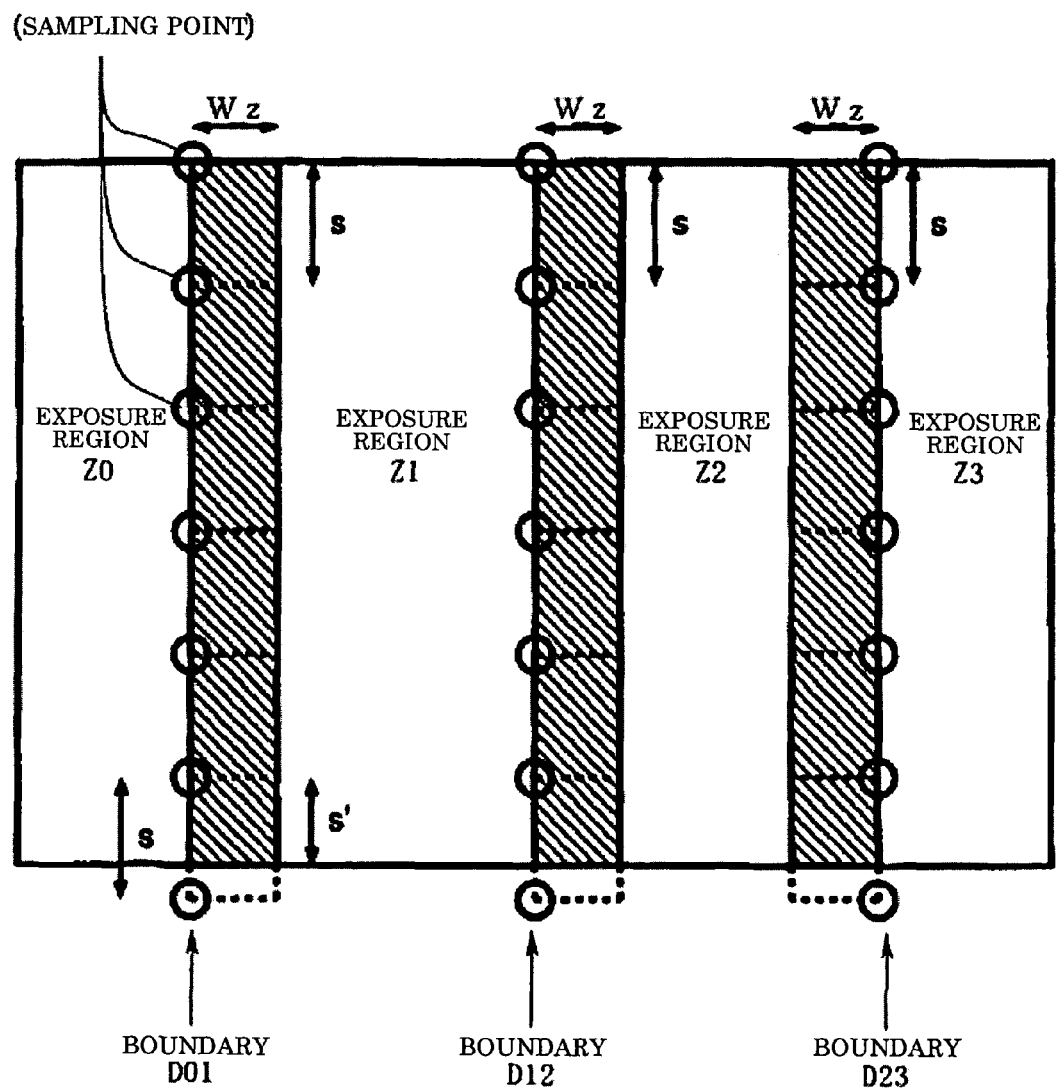
FIG. 4 illustrates a signal level difference of an image data.

Step S7: The process in step S7 detects the signal level difference caused in boundaries D01, D12, and D23 of the exposure regions Z0 to Z3, from the test image data corrected in step S6, and calculates a stitch correction coefficient (refer to FIG. 4).

Figure 5:
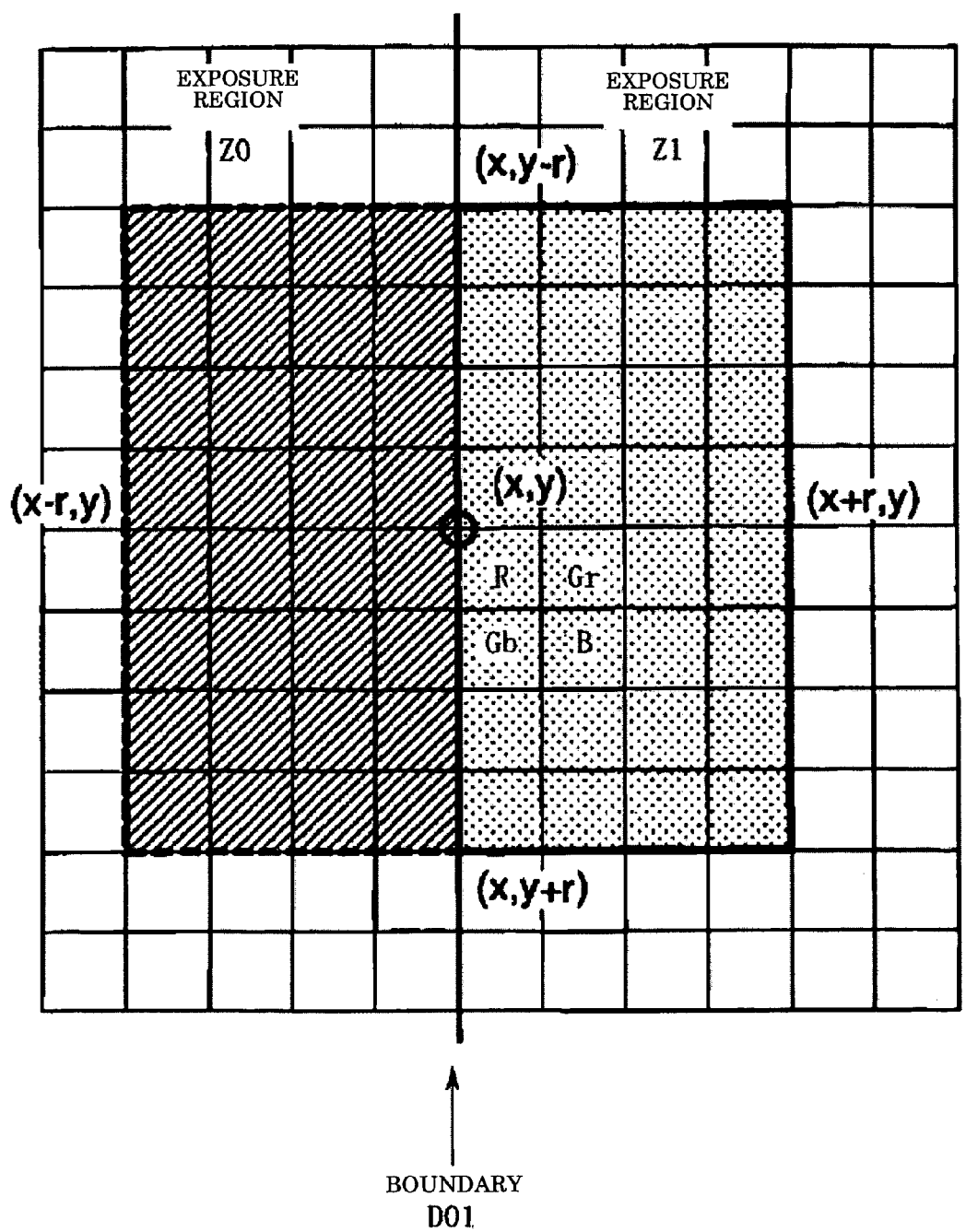
FIG. 5 illustrates a signal level difference of an image data.

For example, the process in step S7 sets up sampling points along with the boundaries D01, D12, and D23, in every $S=2^m$ (where, m is a natural number), and sets up a local region of vertical and horizontal r pixels (for example, r=20) for every sampling point of this (refer to FIG. 5), and calculates a left-hand side average value of each R, Gr, Gb, and B component in the boundary-left-hand side of this local region, and likewise, calculates a right-hand side average value of each R, Gr, Gb, and B component in the boundary-right-hand side of this local region. The Gr component here is an output component of a G pixel which exists in an R pixel row. The Gb pixel is the output component of the G pixel which exists in a B pixel row.

Subsequently, the process in step S7 computes a right-and-left ratio of the signal level difference for every sampling point to make the stitch correction coefficient.

The stitch correction coefficient of the R component=(the left-hand side average value of the R component)/(the right-hand side average value of the R component).

The stitch correction coefficient of the Gr component=(the left-hand side average value of the Gr component)/(the right-hand side average value of the Gr component).

The stitch correction coefficient of the Gb component=(the left-hand side average value of the Gb component)/(the right-hand side average value of the Gb component).

The stitch correction coefficient of the B component=(the left-hand side average value of the B component)/(the right-hand side average value of the B component).

Here, supposing correcting the boundary right-hand side by the multiplication, the process in step S7 calculates the stitch correction coefficient of which the left-hand side average value is a numerator and the right-hand side average value is a denominator. Therefore, when correcting the boundary left-hand side by the multiplication like the boundary D23 of FIG. 4, it is preferred to calculate the stitch correction coefficient of which the right-hand side average value is the numerator and the left-hand side average value is the denominator.

Step S8: The process in step S8 sets the stitch correction coefficient calculated in step S7 in the internal register of the slope generation unit 24.

Step S9: The process in step S9 generates, for every sampling point, the slope variation which makes the stitch correction coefficient calculated in step S7 converge into 1 with a specified width Wz. This specified width Wz may be made to have the width to an extent that the signal level difference becomes indistinctive with varying smoothly. The process in step S9 generates the slope correction data by interpolating this slope variation in the direction of the boundary line.

The process in step S9 corrects the signal level difference of the test image data into the smooth slope variation by multiplying one side or the both sides of the boundary D01, D12, and D23 by the slope correction data.

Step S10: The process in step S10 detects the slope variation of an edge part from the test image data corrected in step S9.

Figure 6:
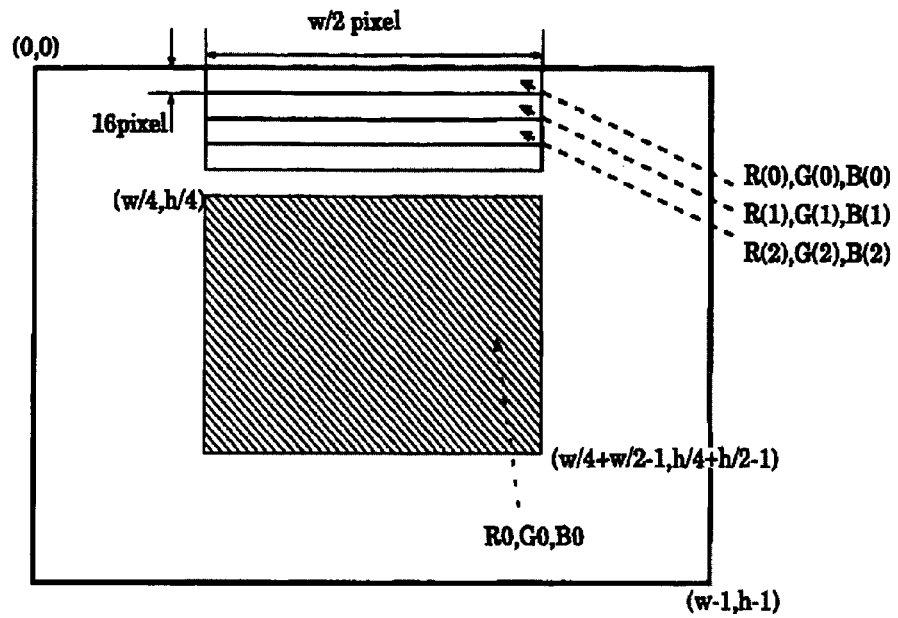
FIG. 6 illustrates a slope variation of an edge part of the image data.

For example, the process in step S10 extracts the RGB component of a center section from the test image data as indicated in FIG. 6, and computes the average value (R0, G0, B0).

Subsequently, the process in step S10 sets up a plurality of rectangular regions at the interval of about 16 pixels as shown in FIG. 6 from an upper side of the test image data toward the center section thereof, and computes the average value [R(i), G(i), B(i)] (for example, i=0, 1, 2 . . . 31) of the RGB component for each of these rectangular regions.

The process in step S10 substitutes this [R(i), G(i), B(i)] into the following formulas, and computes each gain ratio of the slope variation in the upper side.

$g_R(i) = R0/R(i)$ $g_G(i) = G0/G(i)$ $g_B(i) = B0/B(i)$

Subsequently, the process in step S10 determines a color component which shows the largest slope variation with comparing the gain ratio $g_R(0)$, $g_G(0)$, and $g_B(0)$ of the outermost periphery, and searches for i which complies $|g(i)-1| \leq |g(0)-1|/2$ by searching the gain ratio $g(i)$ of the determined color component sequentially from the smaller one, and calculates the minimum n that complies $2^n > (i \times 16)$ based on this i, and determines the effective width $W1 = 2^n$ of the slope variation of the upper side. However, the process in step S10 may calculate the maximum n that complies $2^n < (i \times 16)$, and may determine the effective width of the slope variation $W1 = 2^n$.

The process in step S10 performs the same process as above with respect to the left-hand side of the test image data, the lower side thereof and the right-hand side thereof, and calculates each effective width W2, W3, and W4.

Figure 7:
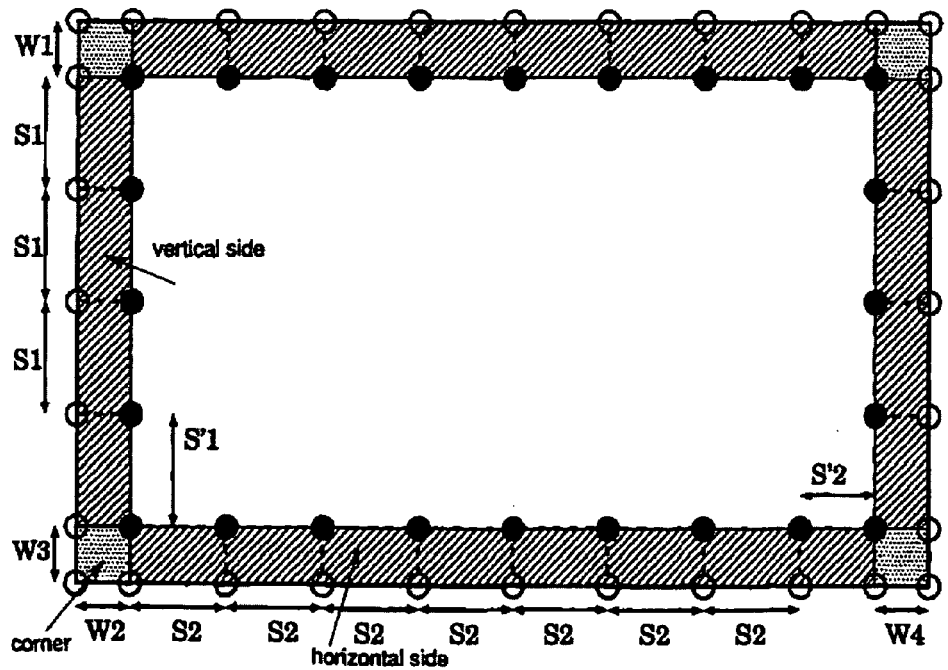
FIG. 7 illustrates a block segment of the edge part.

The process in step S10 determines sampling points of white circles and black circles indicated in FIG. 7 by dividing the test image data into every block according to the effective widths W1 to W4 calculated in this way, and computes the gain ratio (R0/R, G0/G, B0/B) of the slope variation with respect to each of these sampling points.

Step S11: The process in step S11 sets up the gain ratio ($g_R$, $g_G$, $g_B$) for every sampling point calculated in step S10 in the internal register of the slope generation unit 24 as a frame correction coefficient.

<Operation of Image Processing Device 13>

Figure 8:
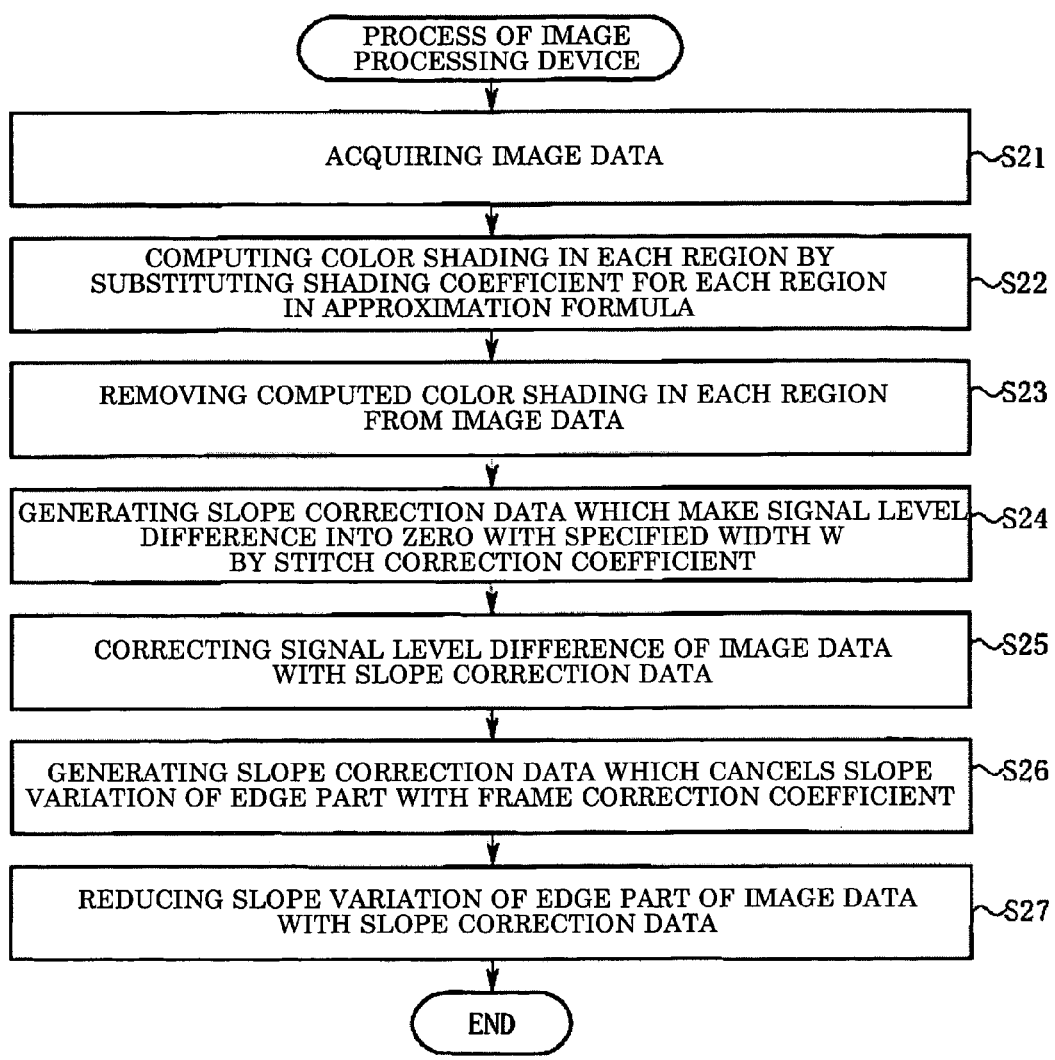
FIG. 8 is a flow chart illustrating an image processing of the image processing device 13.

FIG. 8 is a flow chart describing a process of the image data based on the image processing device 13. Hereinafter, this processing operation will be described based on step numbers shown in FIG. 8.

Step S21: The image acquisition unit 21 takes in the image data which the image pickup section 12 outputs, and stores the image data on an internal memory.

Step S22: The per-region storage unit 22 substitutes, into formula [1], the coefficients $k_1$ to $k_{10}$ set in the per-region storage unit 22 in step S5, and generates the approximate curved surface of the shading correction map Si (i=0 to 3) for each region.

Step S23: The per-region removal unit 23 multiplies the RGB component of the image data by the correction factor of the RGB component which the approximate curved surface for each region indicates. The color shading for each region for every exposure regions Z0 to Z3 included in the image data are reduced by this process.

Step S24: The process in step S24 generates the slope variation which makes the stitch correction coefficient set in the slope generation unit 24 in step S8 converge into 1 with the specified width Wz for each of the sampling points (refer to FIG. 4), and generates the slope correction data by interpolating this slope variation in the direction of the boundary line.

Step S25: The slope correction unit 25 corrects the signal level difference of the image data into the smooth slope variation by multiplying one side or the both sides of the boundary D01, D12, and D23 of the image data by this slope correction data.

Step S26: The slope generation unit 24 generates the slope correction data which cancels the slope variation of the edge part of the image data for each of a corner region/a vertical side/a horizontal side based on the frame correction coefficient.

(1) Corner Region

Figure 9:
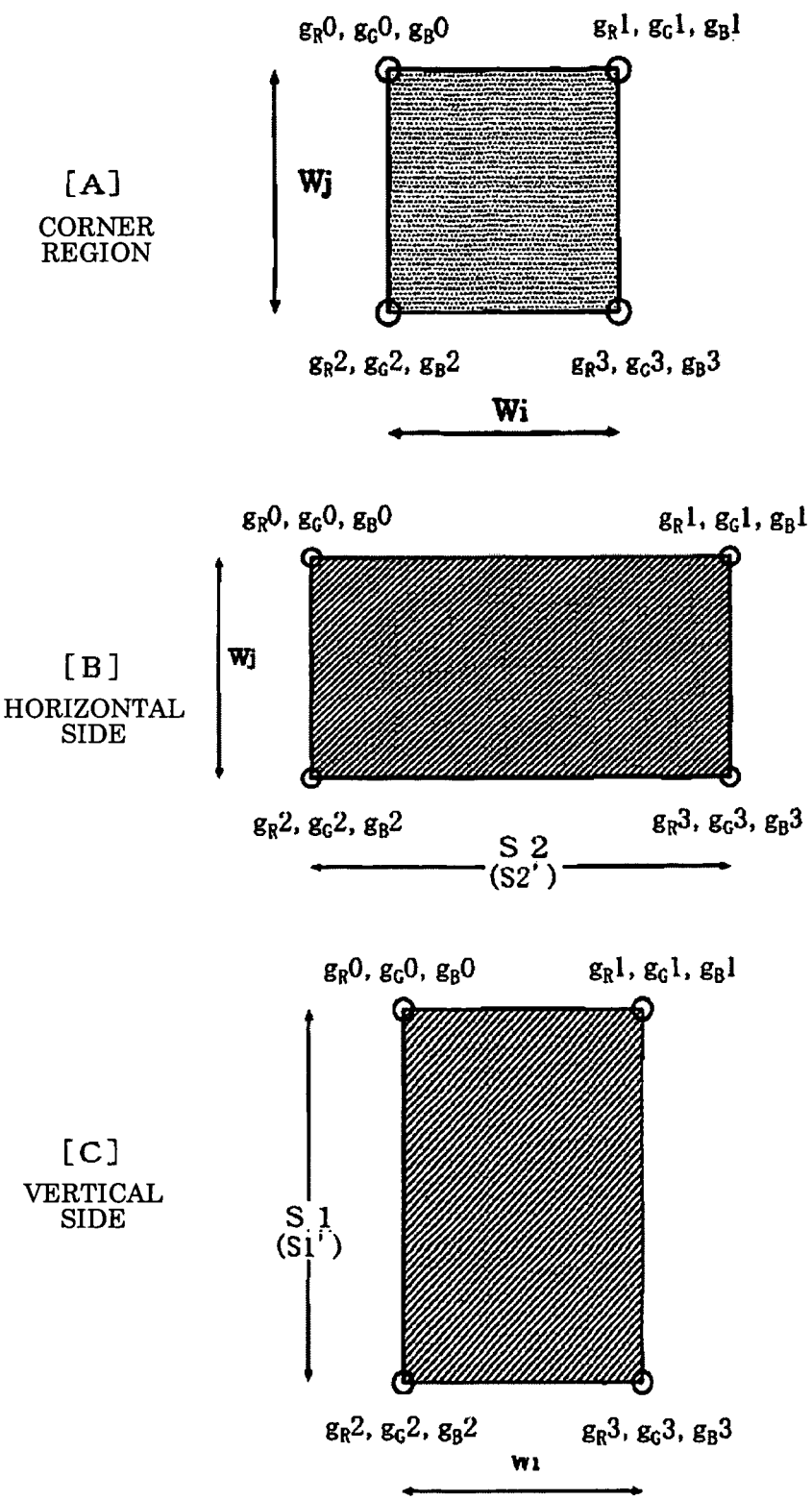
FIG. 9A-C illustrate an interpolating process of a block.

As illustrated in FIG. 9 [A], the gain ratios $g_R0$ to $g_R3$ with respect to the R component are set at vertices of the corner region (horizontal Wi pixels×vertical Wj pixels) of the image data. The slope generation unit 24 computes the slope correction data $k_R(x, y)$ of the corner region by substituting these gain ratios $g_R0$ to $g_R3$ into the following formula.

[Formula 3]

$$k_R(x, y) = \frac{(Wj - y)\{(Wi - x) \cdot g_R0 + x \cdot g_R1\} + y\{(Wi - x) \cdot g_R2 + x \cdot g_R3\}}{Wi \cdot Wj} \quad [3]$$

The coordinate (x, y) in the above formula is a relative coordinate with the vertex of the upper left of the corner region as an origin.

The slope generation unit 24 performs the same process as above with respect to the GB component further, and computes the slope correction data $k_G(x, y)$ and $k_B(x, y)$ of the corner region.

(2) Horizontal Side

As illustrated in FIG. 9[B], the gain ratios $g_R0$ to $g_R3$ with respect to R component are set at vertices of a subregion (horizontal S2 pixels×vertical Wj pixels) of the horizontal side.

The slope generation unit 24 computes the slope correction data $k_R(x, y)$ of the subregion of the horizontal side by substituting these gain ratios $g_R0$ to $g_R3$ into the following formula.

[Formula 4]

$$k_R(x, y) = \frac{(Wj - y)\{(S2 - x) \cdot g_R 0 + x \cdot g_R 1\} + y\{(S2 - x) \cdot g_R 2 + x \cdot g_R 3\}}{S2 \cdot Wj} \quad [4]$$

The coordinate (x, y) in the above formula is the relative coordinate with the vertex of the upper left of the subregion as the origin.

The slope generation unit 24 performs the same process as above with respect to the GB component further, and computes the slope correction data $k_G(x, y)$ and $k_B(x, y)$ of the subregion of the horizontal side.

(3) Vertical Side

As illustrated in FIG. 9[C], the gain ratios $g_R 0$ to $g_R 3$ with respect to the R component are set at the vertices of the subregion (horizontal Wi pixels×vertical S1 pixels) of the vertical side. The slope generation unit 24 computes the slope correction data $k_R(x,y)$ of the subregion of the vertical side by substituting these gain ratios $g_R 0$ to $g_R 3$ into the following formula.

[Formula 5]

$$k_R(x, y) = \frac{(S1 - y)\{(Wi - x) \cdot g_R 0 + x \cdot g_R 1\} + y\{(Wi - x) \cdot g_R 2 + x \cdot g_R 3\}}{Wi \cdot S1} \quad [5]$$

The coordinate (x, y) in the above formula is the relative coordinate having the vertex of the upper left of the subregion as the origin.

The slope generation unit 24 performs the same process as above with respect to the GB component further, and computes the slope correction data $k_G(x, y)$ and $k_B(x, y)$ of the subregion of the vertical side.

Step S27: The slope correction unit 25 corrects the slope variation of the edge part by multiplying the RGB component of the edge part of the image data by the slope correction data calculated in step S26.

The image data with the process mentioned above completed are recorded in a not shown storage media by the recording section 14.

<Effect, etc. of the Present Embodiment>

The present embodiment corrects the signal level difference caused due to the segment exposure at the time of manufacturing the imaging element 12a into the smooth slope variation. In this case, since the correcting range of the image data is limited to the width of the slope variation, the effect of the correction does not extend far and wide.

The present embodiment cancels the slope variation due to the edge part of the imaging element 12a with the slope shape correction data. In this case, in addition, the correcting range of image data is limited to the edge part.

Thus, in the present embodiment, it becomes possible to correct flexibly the signal irregularity created intricately two-dimensionally by combining locally the correction data of the slope shape.

Furthermore, the present embodiment approximates the color shading caused in the test image data in each region of the segment exposure. As mentioned above, the discontinuous signal level difference is caused in the boundary of the segment exposure. In the vicinity of this discontinuous signal level difference, the fitting becomes difficult to be performed and the color shading cannot be approximated accurately.

However, the present embodiment divides this color shading into the regions of the segment exposure to approximate. Therefore, the present embodiment can approximate the color shading more accurately since each of the exposure regions Z0 to Z3 does not include the discontinuous parts, and as a result, the present embodiment can remove much more accurately the color shading superimposed on the image data.

The present embodiment removes first the color shading in each region from the test image data, and can detect more accurately, therefore, the signal irregularity (the signal level difference, the slope variation, or the like) which remain in the test image data, and will be able to calibrate, as a result, the image processing device 13 much more accurately according to the accurate signal irregularity.

<Supplementary Subjects of Embodiment>

In the embodiment mentioned above, the case where the image processing device 13 is installed in the imaging device 11 is described. However, the present application is not limited to this. For example, by a computer and an image processing program, the image processing device of the present embodiment can be realized by a software program (refer to FIG. 8).

The embodiment mentioned above removes independently the signal level difference in the exposure boundary and the slope variation of the edge part. However, the present embodiment is not limited to this. Both of the signal level difference and the slope variation are corrected by the correction data of the slope shape. Therefore, by integrating the stitch correction coefficient and the frame correction coefficient to set in the slope generation unit 24, the slope correction data for the both coefficients can be generated without discriminating. Specifically, it is preferred to define the stitch correction coefficient by the coefficient value of the vertex position of the block in the same way as the frame correction coefficient.

Figure 10:
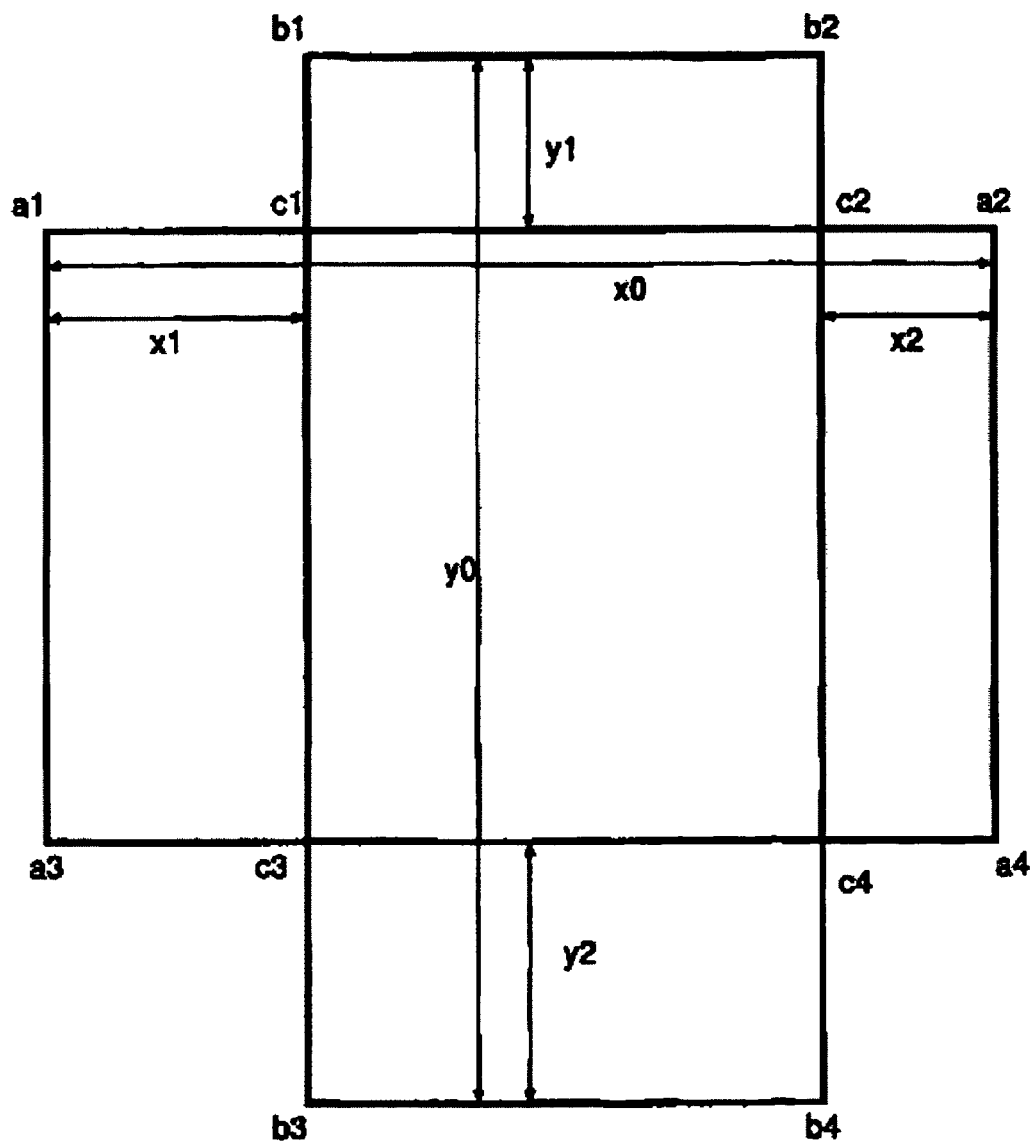
FIG. 10 illustrates an integrating process of the block.

When the both blocks of the correction information overlap, it is preferred to integrate the correction information by the linear interpolation. For example, as illustrated in FIG. 10, the case where the block of the stitch correction coefficients a1 to a4 and the block of the frame correction coefficients b1 to b4 overlap partially is caused. In this case, coefficient values C1 to C4 of the vertex positions of the overlap region (this is a block, too.) shown in FIG. 10 can newly be calculated by the following formula.

[Formula 6]

$$c1 = \frac{a1(xo - x1) + a2 \cdot x1}{x0} \times \frac{b1(yo - y1) + b3 \cdot y1}{y0}$$

$$c2 = \frac{a1 \cdot x2 + a2(x0 - x2)}{x0} \times \frac{b2(yo - y1) + b4 \cdot y1}{y0}$$

$$c3 = \frac{a3(xo - x1) + a4 \cdot x1}{x0} \times \frac{b1 \cdot y2 + b3(yo - y2)}{y0}$$

$$c1 = \frac{a3 \cdot x2 + a4(xo - x2)}{x0} \times \frac{b2 \cdot y2 + b4(yo - y2)}{y0}$$

Such computation enables to generate the correction information for more intricate signal irregularity by converting the overlap region of the blocks into a new block.

The signal irregularity caused in the imaging element 12a may change due to a multiplier action of the optical properties of the shooting lens and the imaging element 12a. In this case, the correction information (the stitch correction coefficient, the frame correction coefficient, and the color shading) may be calculated to be set in the image processing device 13 for every type of the shooting lens. Such setting enables to select and use the suitable correction information according to the type of the shooting lens.

The correction information (the stitch correction coefficient and frame correction coefficient, the color shading) may be calculated to be set in the image processing device 13 for each of optical conditions such as an exit pupil position and exit pupil diameter of the shooting lens. Such setting enables to select and use the suitable correction information according to the optical conditions of the shooting lens.

When the shooting lens, such as a shift lens or a tilt lens, is used, the correction information (the stitch correction coefficient and frame correction coefficient, the color shading) may be calculated to be set in the image processing device 13 for each of the shift amount and the tilt amount. Such setting enables to select and use the suitable correction information according to the optical conditions of the shooting lens.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. An image processing device comprising:
    an image acquisition unit taking in an image data generated by an imaging element;
    a slope generation unit generating a slope correction data correcting, in a slope-shape waveform, a signal irregularity caused in a boundary of a predetermined line in the image data due to a manufacturing process of the imaging element; and
    a slope correction unit correcting the signal irregularity within the image data using the slope correction data for correction, wherein
    the slope correction data has specified values on the predetermined line in the image data and converges to 1 with a specified distance from the line, the specified distance being set to have an extent that the signal irregularity becomes indistinctive with varying smoothly.

2. The image processing device according to claim 1, wherein
    the slope generation unit generates the slope correction data for correction by dividing an image region having caused the signal irregularity into a plurality of blocks, storing correction information of a representative-point position in each of the blocks, and interpolating and computing the correction information of the representative-point position.

3. The image processing device according to claim 1, wherein
    the slope generation unit generates a slope correction data converging a signal level difference caused in the image data due to a boundary of a segment exposure at the time of manufacturing the imaging element into a slope shape, and
    the slope correction unit corrects the signal level difference to a smooth slope variation using the slope correction data for convergence.

4. The image processing device according to claim 1, wherein
    the slope generation unit generates a slope correction data cancelling a slope variation superimposed on the image data in an edge of an imaging region of the imaging element, and
    the slope correction unit corrects the slope variation using the slope correction data for cancellation.

5. The image processing device according to claim 1, further comprising:
    a per-region storage unit storing a color shading caused in each region of the segment exposure due to the segment exposure at the time of manufacturing the imaging element; and
    a per-region removal unit removing the color shading in each region from the image data.

6. An image processing device comprising:
    an image acquisition unit taking in an image data generated by an imaging element;
    a per-region storage unit storing a color shading caused in each region of a segment exposure due to the segment exposure at the time of manufacturing the imaging element;
    a per-region removal unit removing the color shading in each region from the image data; and
    a slope generation unit generating a slope correction data correcting, in a slope-shape waveform, a signal irregularity caused in a boundary of a predetermined line in the image data due to a manufacturing process of the imaging element; and
    a slope correction unit correcting the signal irregularity within the image data using the slope correction data for correction, wherein
    the slope correction data has specified values on the predetermined line in the image data and converges to 1 with a specified distance from the line, the specified distance being set to have an extent that the signal irregularity becomes indistinctive with varying smoothly.

7. A calibration method of the image processing device according to claim 1, comprising:
    generating a test image data by performing photoelectric conversion on a uniform light with the imaging element, the imaging element being manufactured by a multi-cycle segment exposure;
    detecting a color shading in each region by dividing the test image data into each region of the segment exposure, and fitting each region of the image to a signal pattern of the color shading;
    removing the color shading in each region from the test image data;
    detecting a signal irregularity remaining in the test image data having removed the color shading in each region; and
    calculating correction information indicating the signal irregularity, and setting the correction information to the slope generation unit.

8. An imaging device comprising:
    the image processing device according to claim 1; and
    an image pickup section generating an image data by performing photoelectric conversion on a subject with an imaging element, wherein
    the image processing device performing process on the image data generated by the image pickup section.

9. A non-transitory computer readable storage medium storing an image processing program causing a computer to function as the image processing device according to claim 1.

10. An image processing method comprising:

taking in an image data generated by an imaging element;

generating a slope correction data correcting, in a slope-shape waveform, a signal irregularity caused in a boundary of a predetermined line in the image data due to a manufacturing process of the imaging element; and correcting the signal irregularity within the image data using the slope correction data, wherein the slope correction data has specified values on the predetermined line in the image data and converges to 1 with a specified distance from the line, the specified distance being set to have an extent that the signal irregularity becomes indistinctive with varying smoothly.

* * * * *